US009520711B1

(12) United States Patent
Xiong

(10) Patent No.: US 9,520,711 B1
(45) Date of Patent: Dec. 13, 2016

(54) GATE DRIVE INTEGRATED CIRCUIT WITH INPUT LINE OVERVOLTAGE PROTECTION FOR A HALF-BRIDGE POWER CONVERTER

(71) Applicant: Universal Lighting Technologies, Inc., Madison, AL (US)

(72) Inventor: Wei Xiong, Madison, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 0 days.

(21) Appl. No.: 14/490,946

(22) Filed: Sep. 19, 2014

Related U.S. Application Data

(60) Provisional application No. 61/886,886, filed on Oct. 4, 2013.

(51) Int. Cl.
| | |
|---|---|
| *H02M 3/335* | (2006.01) |
| *H02H 7/122* | (2006.01) |
| *H02M 7/5387* | (2007.01) |
| *H02M 5/458* | (2006.01) |
| *H02M 1/08* | (2006.01) |
| *H02H 3/20* | (2006.01) |
| *H05B 37/02* | (2006.01) |

(52) U.S. Cl.
CPC ............... *H02H 7/122* (2013.01); *H02H 3/20* (2013.01); *H02M 1/08* (2013.01); *H02M 5/4585* (2013.01); *H02M 7/53871* (2013.01); *H05B 37/0227* (2013.01)

(58) Field of Classification Search
CPC ................................................... H05B 39/045
See application file for complete search history.

(56) References Cited

U.S. PATENT DOCUMENTS

| | | | | |
|---|---|---|---|---|
| 2007/0247084 | A1* | 10/2007 | Zhao | ............................. 315/291 |
| 2011/0204803 | A1* | 8/2011 | Grotkowski et al. | ......... 315/194 |
| 2012/0250360 | A1* | 10/2012 | Orr | ..................... H02M 3/3376 363/21.02 |

OTHER PUBLICATIONS

PIC18F8722 Family Data Sheet, Microchip, 2008.*
Microchip 'Core Independent Peripherals for 8-bit PIC Microcontrollers' Nov. 29, 2011.*

* cited by examiner

*Primary Examiner* — Don Le
(74) *Attorney, Agent, or Firm* — Patterson Intellectual Property Law, P.C.; Mark J. Patterson; Gary L. Montle

(57) ABSTRACT

A driver circuit provides power from a power source to a load. The driver circuit includes a surge protector, an input stage (e.g., full wave rectifier), a controller and an output stage (e.g., a half bridge inverter). The input stage receives power from the power source and provides a direct current (DC) power rail. The controller operates the output stage to provide power from the DC power rail to the load. The controller includes an overvoltage sensing module that shuts down the output stage when the DC power rail exceeds a predetermined voltage. Ceasing operation of the output stage protects the output stage from damage while the DC power rail is above the predetermined voltage.

18 Claims, 2 Drawing Sheets

GATE DRIVE INTEGRATED CIRCUIT WITH INPUT LINE OVERVOLTAGE PROTECTION FOR A HALF-BRIDGE POWER CONVERTER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to and hereby incorporates by reference in its entirety U.S. Provisional Patent Application No. 61/886,886 entitled "GATE DRIVE INTEGRATED CIRCUIT WITH INPUT LINE OVERVOLTAGE PROTECTION FOR A HALF-BRIDGE POWER CONVERTER" filed on Oct. 4, 2013.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to protecting driver circuits and ballasts from input power surges. More particularly, this invention pertains to protecting driver circuit and ballast inverters during an input power surge.

Lightning causes high-voltage surges in power supplies to electronics. To meet the standard for outdoor surge protection, a circuit must survive a 6 KV surge combo-wave. Referring to prior art FIG. 1, most driver circuits or ballasts include a half bridge based inverter or converter. The driver circuit 100 receives power from a power supply 102 and provides power to a load 104. The driver circuit 100 includes an input stage 116, a surge protector 114, a voltage regulator 108, a controller 106, and an output stage 118. The surge protector 114 limits the voltage from the power source 102 to the input stage 116. The input stage 116 includes a full wave rectifier, and a smoothing capacitor C1. Four diodes (i.e., diodes D1-D4) form a full wave rectifier operable to receive alternating current (AC) power from the power supply 102 and provide a direct current (DC) power rail 112. The smoothing capacitor C1 is an electrolytic capacitor that buffers the DC power rail. The voltage regulator 108 and a second capacitor C2 provide a bias voltage VCC to the controller 106. The output stage 118 is a half bridge inverter including a first switch Q1 and a second switch Q2. The controller 106 drives the first switch Q1 and the second switch Q2 such that the output stage 118 provides AC power to the load 104 from the DC power rail 112. The controller 106 provides drive signals to the first switch Q1 and the second switch Q2 so long as the controller 406 is receiving the bias voltage VCC from the oldest regulator 108 and a disable pin of the controller 406 is receiving the bias voltage VCC (i.e., not grounded).

When a high-voltage surge appears at the power source 102, even with the surge protector 114, high-voltage is created across the smoothing capacitor C1 (i.e., at the DC power rail 112). Without any further protection, the first switch Q1 and the second switch Q2 will not survive the surge because the first switch Q1 and the second switch Q2 are designed to meet the steady-state voltage requirement. That is, if the DC power rail operates at approximately 470 V DC, a 600 V rated first switch Q1 and second switch Q2 will be used. If the DC power rail 112 exceeds 600 V during the surge (which frequently happens), the voltage rating of the first switch Q1 and the second switch Q2 will be exceeded, causing failure of the output stage 118 and thus the driver circuit 100.

BRIEF SUMMARY OF THE INVENTION

Aspects of the present invention provide a driver circuit that provides power from a power source to a load. The driver circuit includes a surge protector, an input stage (e.g., full wave rectifier), a controller and an output stage (e.g., a half bridge inverter). The input stage receives power from the power source and provides a direct current (DC) power rail. The controller operates the output stage to provide power from the DC power rail to the load. The controller includes an overvoltage sensing module that shuts down the output stage when the DC power rail exceeds a predetermined voltage. Ceasing operation of the output stage protects the output stage from damage while the DC power rail is above the predetermined voltage.

In one aspect, a driver circuit operable to provide power from a power source to a load includes an input stage, a surge protector, and output stage, and a controller. The input stage is operable to receive power from the power source and provide a DC power rail. The voltage of the DC power rail is substantially proportional to a voltage of the power source. The surge protector is operable to limit the voltage of the power received at the input stage from the power source. The output stage is operable to receive power from the DC power rail and provide an output power to the load when operating. The output stage includes an inverter. The controller is configured to operate the output stage, determine a voltage of the DC power rail, and cease operating the output stage when the determined voltage of the DC power rail exceeds a predetermined threshold such that the output stage ceases providing power to the load.

In another aspect, a light fixture is operable to provide light in response to receiving power from a power source. A driver circuit operable to provide power from a power source to a load includes an input stage, a surge protector, and output stage, and a controller. The input stage is operable to receive power from the power source and provide a DC power rail. The voltage of the DC power rail is substantially proportional to a voltage of the power source. The surge protector is operable to limit the voltage of the power received at the input stage from the power source. The output stage is operable to receive power from the DC power rail and provide an output power to the load when operating. The output stage includes an inverter. The controller is configured to operate the output stage, determine a voltage of the DC power rail, and cease operating the output stage when the determined voltage of the DC power rail exceeds a predetermined threshold such that the output stage ceases providing power to the load.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
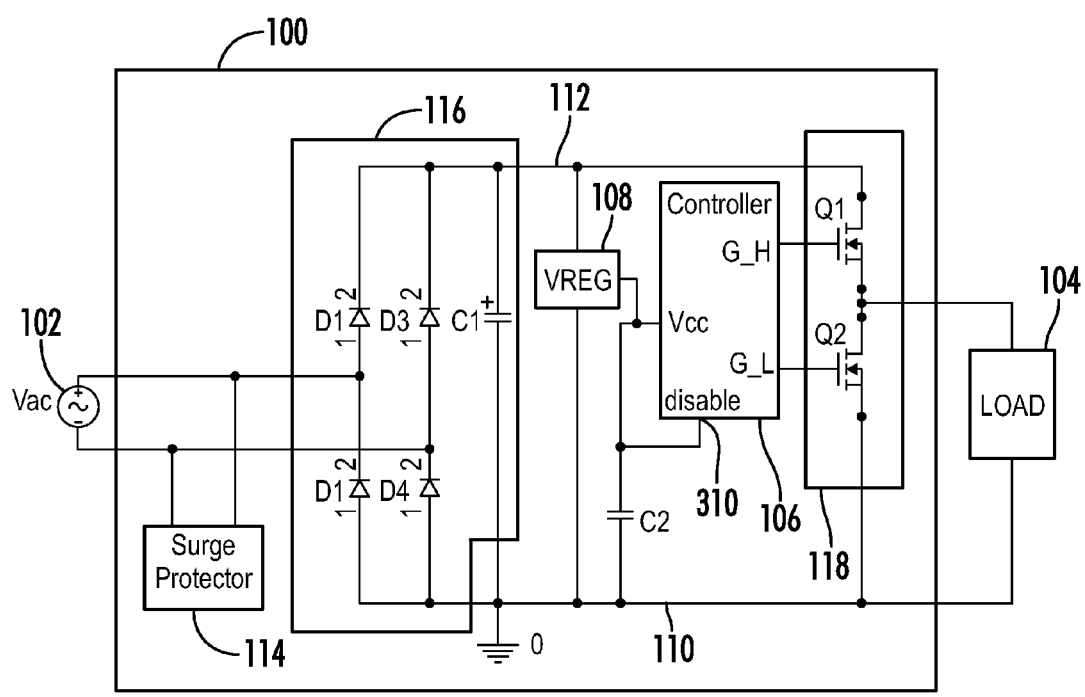
FIG. 1 is a block and partial schematic diagram of a prior art driver circuit.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "coupled" and "connected" mean at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams.

Figure 2:
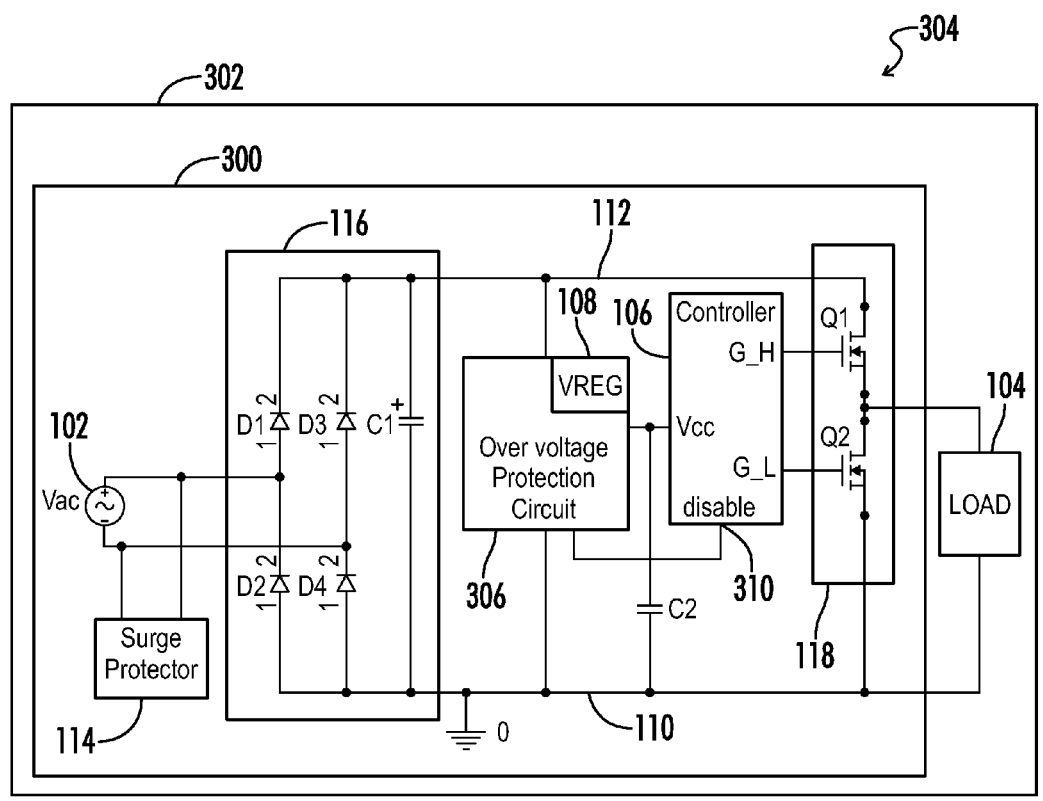
FIG. 2 is a block and partial schematic diagram of a light fixture including a driver circuit having a controller with an overvoltage sensing module.

Referring to FIG. 2, a light fixture 304 is operable to provide light in response to receiving power from the power source 102. The light fixture 304 includes a light source 104, a driver circuit 300, and a housing 302. The light source 104 is operable to provide light in response to receiving power. In one embodiment, the light source 104 includes a plurality of light emitting diodes. In another embodiment, the light source 104 includes a fluorescent lamp. The housing 302 is configured to support the light source 104 and the driver circuit 300.

The driver circuit 300 is operable to provide power from the power source 102 to the light source 104. The driver circuit 300 includes the input stage 118, the surge protector 114, the output stage 118, the controller 406, and an overvoltage sensing module 306. The surge protector 114 is operable to limit the voltage of the power received at the input stage 118 from the power source 102. It is contemplated that the surge protector 114 may be integral with the input stage 116 or physically separate from the driver circuit 300 within the scope of the claims.

The input stage 118 is operable to receive power from the power source 102 and provide the DC power rail 112. The voltage of the DC power rail substantially proportional to the voltage of the power source 102. In one embodiment, the power source 102 is an AC power source, and the input stage 118 includes a full wave rectifier such that the voltage of the AC power source 102, as limited by the surge protector 114, passes through the full wave rectifier to the overvoltage sensing module 306 and the output stage 118. In one embodiment, the voltage of the DC power rail 112 is approximately 470 volts DC.

The output stage 118 is operable to receive power from the DC power rail 112 and provide output power to the light source 104 when operating. The output stage 118 includes an inverter. In one embodiment, the inverter is a half bridge inverter including a pair of switches (i.e., a first switch Q1 and a second switch Q2). Each switch of the pair of switches has a rated voltage. In one embodiment, each switch is rated at approximately 600 volts.

The controller 406 is operable to operate the output stage 118 such that the output stage 118 provides power to the load 104. That is, the controller 406 provides drive signals to the first switch Q1 and the second switch Q2 of the output stage 118, and the output stage 118 provides power from the DC power rail 112 to the load 104. In one embodiment, the controller 406 is configured to determine a voltage of the DC power rail 112 and cease operating the output stage 118 when the determined voltage of the DC power rail exceeds a predetermined threshold. includes a In one embodiment, the controller 406 provides pulse width modulated drive signals as a function of an output current of the output power provided to the load 104 by the output stage 118. In one embodiment, the controller 406 includes an overvoltage sensing module 306 and a pulse width modulation module 320. The pulse width modulation module 320 is configured to provide the drive signals to the output stage switches Q1, Q2, as a function of a duty cycle. The controller 406 determines the duty cycle provided to the pulse width modulation module 320 as a function of the power (e.g., current) provided to the load 104 by the driver circuit 300.

In one embodiment, the driver circuit 300 further includes a voltage regulator 408. The voltage regulator 408 is operable to receive power from the DC power rail 112 and provide the bias voltage VCC to the controller 406. In one embodiment, the voltage regulator 408 is integral with the controller 406. In another embodiment, the voltage regulator 408 is separate from the controller 406 and is electrically positioned between the controller 406 and the DC power rail 112. The overvoltage sensing module 306 is separately directly connected to the DC power rail 112.

The overvoltage sensing module 306 is operable to determine the voltage of the DC power rail 112 and disable the pulse width modulation module 320 when the determined voltage of the DC power rail 112 exceeds the predetermined threshold such that the pulse width modulation module 320 does not provide gate drive signals to the output stage 118. In one embodiment, the overvoltage sensing module 306 disables the pulse width modulation module 320 by blocking the bias voltage of the controller 406 from the pulse width modulation module 320. In another embodiment, the overvoltage sensing module 306 disables the pulse width modulation module 320 by reducing the duty cycle of the pulse width modulation module 320 to zero percent. In another embodiment, the overvoltage sensing module 306 disables the pulse width modulation module 320 by blocking the bias voltage from the voltage regulator 408 to the pulse width modulation module 320.

In one embodiment, the predetermined threshold at which the overvoltage sensing module 306 disables the pulse width modulation module 320 (i.e., ceases to operate the output stage 118) is approximately equal to the rated voltage of the first switch Q1 of the output stage 118. In another embodiment, the predetermined threshold is approximately equal to the rated voltage of the second switch Q2 of the output stage 118. When both the first switch Q1 and the second switch Q2 are off, the output stage 118 (e.g., half bridge inverter) can survive twice the rated voltage of the first and second switches Q1, Q2 individually. That is, for 600 volt rated switches, the output stage 118 can survive 1200 volts (i.e., function properly after the power surge). For a 470 volt DC power rail 112, a surge voltage will commonly exceed 600 volts (i.e., the rated voltage of one switch of the output stage 118), but the surge protector 114 will generally limit the voltage of the DC power rail 112 to less than the 1200 volt capacity of the output stage 118 when the output stage 118 has been shut down (e.g., when the controller 406 is shut down and no longer providing drive signals to the first and second switches Q1, Q2). When the voltage of the DC power rail 112 falls below the predetermined threshold, the overvoltage sensing module 306 enables the controller 406, resuming operation of the driver circuit 116 and power to the load 104.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful GATE DRIVE INTEGRATED CIRCUIT WITH INPUT LINE OVERVOLTAGE PROTECTION FOR A HALF-BRIDGE POWER CONVERTER it is not intended that such references be construed as limitations upon the scope of this invention except as set forth in the following claims.

What is claimed is:

1. A driver circuit operable to provide power from a power source to a load, said driver circuit comprising:
   an input stage operable to receive power from the power source and provide a direct current (DC) power rail, wherein a voltage of the DC power rail is substantially proportional to a voltage of the power source;
   an output stage operable to receive power from the DC power rail and provide output power to the load when operating,
   wherein the output stage comprises a half-bridge inverter comprising a pair of switches, at least one of the pair of switches having a rated voltage;
   a controller configured to:
      operate the output stage such that the output stage provides power to the load;
      determine a voltage of the DC power rail; and
         cease operating the output stage when the determined voltage of the DC power rail exceeds a predetermined threshold of approximately the rated voltage of the at least one switch of the pair of switches, such that the output stage ceases providing power to the load; and wherein the controller comprises
      a pulse width modulation module configured to provide gate drive signals to the output stage, and
      an overvoltage sensing module configured to
         determine the voltage of the DC power rail and
         disable the pulse width modulation module by blocking a bias voltage of the controller from the pulse width modulation module when the determined voltage of the DC power rail exceeds the predetermined threshold.

2. The driver circuit of claim 1, wherein:
   the driver circuit further comprises a surge protector operable to limit the voltage of power received from the power source at the input stage.

3. The driver circuit of claim 1, wherein:
   the power source is an alternating current (AC) power source; and
   the input stage comprises a full wave rectifier such that the voltage of the AC power source, as limited by a surge protector, passes through the full wave rectifier to the controller and the output stage.

4. The driver circuit of claim 1, wherein the controller comprises:
   a pulse width modulation module configured to provide gate drive signals to the output stage; and
   an overvoltage sensing module configured to:
      determine the voltage of the DC power rail; and
      disable the pulse width modulation module when the determined voltage of the DC power rail exceeds the predetermined threshold such that the pulse width modulation module does not provide gate drive signals to the output stage.

5. The driver circuit of claim 1, wherein the controller comprises:
   a pulse width modulation module configured to provide gate drive signals to the output stage as a function of a duty cycle, wherein the controller is configured to determine the duty cycle as a function of the power provided to the load by the drive circuit; and
   an overvoltage sensing module configured to:
      determine the voltage of the DC power rail; and
      reduce the duty cycle of the pulse width modulation module to zero percent when the determined voltage of the DC power rail exceeds the predetermined threshold.

6. The driver circuit of claim 1, wherein:
   the driver circuit further comprises a voltage regulator operable to receive power from the DC power rail and provide a bias voltage to the controller;
   the controller is configured to receive a bias voltage from the voltage regulator; and
   the controller further comprises an overvoltage sensing module connected to the DC power rail.

7. The driver circuit of claim 1, wherein:
   the driver circuit further comprises a voltage regulator operable to receive power from the DC power rail and provide a bias voltage to the controller;
   the controller comprises a pulse width modulation module configured to provide gate drive signals to the output stage; and
   the controller further comprises an overvoltage sensing module configured to:
      determine the voltage of the DC power rail; and
      block the bias voltage from the voltage regulator to the pulse width modulation module when the determined voltage of the DC power rail exceeds the predetermined threshold.

8. The driver circuit of claim 1, wherein:
   the driver circuit further comprises a voltage regulator operable to receive power from the DC power rail and provide a bias voltage for the controller; and
   the voltage regulator is internal to the controller.

9. A light fixture operable to provide light in response to receiving power from a power source, said light fixture comprising:
- a light source operable to provide light in response to receiving power;
- a driver circuit operable to provide power from the power source to the light source, said driver circuit comprising:
  - an input stage operable to receive power from the power source and provide a direct current (DC) power rail, wherein a voltage of the DC power rail is substantially proportional to a voltage of the power source;
  - an output stage operable to receive power from the DC power rail and provide output power to the light source when operating, wherein the output stage comprises a half-bridge inverter comprising a pair of switches, at least one of the pair of switches having a rated voltage;
- a controller configured to:
  - operate the output stage such that the output stage provides power to the load;
  - determine a voltage of the DC power rail; and
  - cease operating the output stage when the determined voltage of the DC power rail exceeds a predetermined threshold of approximately the rated voltage, such that the output stage ceases providing power to the load; and
- a housing configured to support the light source and the driver circuit; and
- wherein the controller comprises
  - a pulse width modulation module configured to provide gate drive signals to the output stage, and
  - an overvoltage sensing module configured to
    - determine the voltage of the DC power rail, and
    - disable the pulse width modulation module by blocking a bias voltage of the controller from the pulse width modulation module when the determined voltage of the DC power rail exceeds the predetermined threshold.

10. The light fixture of claim 9, wherein:
the driver circuit further comprises a surge protector operable to limit the voltage of power received from the power source at the input stage.

11. The light fixture of claim 9, wherein:
the power source is an alternating current (AC) power source; and
the input stage comprises a full wave rectifier such that the voltage of the AC power source, as limited by the surge protector, passes through the full wave rectifier to the output stage and an overvoltage sensing module of the controller.

12. The light fixture of claim 9, wherein the controller comprises:
- a pulse width modulation module configured to provide gate drive signals to the output stage; and
- an overvoltage sensing module configured to:
  - determine the voltage of the DC power rail; and
  - disable the pulse width modulation module when the determined voltage of the DC power rail exceeds the predetermined threshold such that the pulse width modulation module does not provide gate drive signals to the output stage.

13. The light fixture of claim 9, wherein the controller comprises:
- a pulse width modulation module configured to provide gate drive signals to the output stage as a function of a duty cycle, wherein the controller is configured to determine the duty cycle as a function of the power provided to the load by the drive circuit; and
- an overvoltage sensing module configured to:
  - determine the voltage of the DC power rail; and
  - reduce the duty cycle of the pulse width modulation module to zero percent when the determined voltage of the DC power rail exceeds the predetermined threshold.

14. The light fixture of claim 9, wherein:
the driver circuit further comprises a voltage regulator operable to receive power from the DC power rail and provide a bias voltage to the controller;
the controller is configured to receive a bias voltage from the voltage regulator; and
the controller further comprises an overvoltage sensing module connected to the DC power rail.

15. The light fixture of claim 9, wherein:
the driver circuit further comprises a voltage regulator operable to receive power from the DC power rail and provide a bias voltage to the controller;
the controller comprises a pulse width modulation module configured to provide gate drive signals to the output stage; and
the controller further comprises an overvoltage sensing module configured to:
  - determine the voltage of the DC power rail; and
  - block the bias voltage from the voltage regulator to the pulse width modulation module when the determined voltage of the DC power rail exceeds the predetermined threshold.

16. The light fixture of claim 9, wherein:
the driver circuit further comprises a voltage regulator operable to receive power from the DC power rail and provide a bias voltage for the controller; and
the voltage regulator is internal to the controller.

17. The light fixture of claim 9, wherein the light source is a fluorescent lamp.

18. The light fixture of claim 9, wherein the light source comprises a light emitting diode.

* * * * *